US011285922B1

(12) United States Patent
Tolbert

(10) Patent No.: US 11,285,922 B1
(45) Date of Patent: Mar. 29, 2022

(54) WHEEL BRUSH FOR A WHEELCHAIR

(71) Applicant: Billy Tolbert, Evergreen, AL (US)

(72) Inventor: Billy Tolbert, Evergreen, AL (US)

( * ) Notice: Subject to any disclaimer, the term of this patent is extended or adjusted under 35 U.S.C. 154(b) by 322 days.

(21) Appl. No.: 16/556,138

(22) Filed: Aug. 29, 2019

(51) Int. Cl.
*B60S 1/68* (2006.01)
*A46B 17/02* (2006.01)
*A61G 5/10* (2006.01)

(52) U.S. Cl.
CPC ............... *B60S 1/68* (2013.01); *A46B 17/02* (2013.01); *A61G 5/10* (2013.01); *A46B 2200/3073* (2013.01)

(58) Field of Classification Search
CPC . B60S 1/68; B60S 1/685; B60S 3/042; A61G 5/10; A46B 16/00; A46B 2200/30; A46B 2200/3046; A46B 2200/3073; A46B 17/02; B08B 1/002; B08B 1/02
USPC ............ 15/176.1, 176.6, 202, 256.5, 256.51; 280/855, 158.1, 856
See application file for complete search history.

(56) References Cited

U.S. PATENT DOCUMENTS

| | | | | |
|---|---|---|---|---|
| 725,843 A * | 4/1903 | Henn, Jr. | ............... | A46B 9/02 15/160 |
| 1,407,214 A * | 2/1922 | Osborn | ............... | A46B 7/04 15/176.6 |
| 1,571,999 A * | 2/1926 | Davis | ............... | A46B 7/04 15/176.6 |
| 1,742,929 A * | 1/1930 | Ovtshenikoff | ............... | A46B 15/00 15/160 |
| 1,766,870 A * | 6/1930 | Becker | ............... | A46B 15/00 15/160 |
| 3,079,621 A * | 3/1963 | Florenz | ............... | A46B 9/02 15/160 |
| 3,231,293 A * | 1/1966 | Loustaunau | ............... | A61G 5/10 280/211 |
| 4,605,239 A * | 8/1986 | Warfel | ............... | A61G 5/10 15/160 |
| 5,168,660 A * | 12/1992 | Smith | ............... | B08B 9/021 15/104.04 |
| 5,295,278 A * | 3/1994 | Condon | ............... | A46B 5/0012 15/104.04 |
| 5,343,588 A * | 9/1994 | Chen | ............... | A46B 9/02 15/256.5 |
| 5,566,420 A * | 10/1996 | Specht | ............... | A46B 7/023 15/256.5 |
| 5,857,238 A * | 1/1999 | Jmill | ............... | B60S 1/68 15/256.5 |

(Continued)

FOREIGN PATENT DOCUMENTS

FR 2627139 * 8/1989
JP 56-157651 * 12/1981

*Primary Examiner* — Marc Carlson
(74) *Attorney, Agent, or Firm* — Peter Loffler

(57) ABSTRACT

A wheel brush for a wheelchair has an inverted U-shaped brush housing that has a longitudinal channel and an open bottom. A brush head is slidably received within the channel such that bristles located on the brush head extend out through the open bottom of the brush housing. The open bottom is sufficiently narrow as to prevent the brush head from passing therepast. A resilient clip is attached to the brush housing and is clipped to a vertical post of the wheelchair, such as the arm rest post, and is positioned so that the bristles engage a portion of the outer periphery of one of the wheels so as to brush clean the wheels whenever the wheelchair rolls and the rear wheels rotate.

4 Claims, 6 Drawing Sheets

(56) References Cited

U.S. PATENT DOCUMENTS

| | | | | |
|---|---|---|---|---|
| 6,434,781 | B1* | 8/2002 | Guerra | A63B 57/60 |
| | | | | 15/256.5 |
| 9,346,438 | B1* | 5/2016 | Parker, III | B08B 1/002 |
| 9,358,959 | B2* | 6/2016 | Majka | B62J 11/13 |
| 9,718,446 | B1* | 8/2017 | Tolbert | B60S 1/685 |
| 10,441,080 | B2* | 10/2019 | Hall | A46B 15/0036 |
| 2008/0258451 | A1* | 10/2008 | Thygesen | B60S 1/68 |
| | | | | 280/855 |
| 2014/0061271 | A1* | 3/2014 | Tate | B62K 19/40 |
| | | | | 224/545 |
| 2014/0284911 | A1* | 9/2014 | Kueppers | B60S 1/68 |
| | | | | 280/855 |
| 2017/0203735 | A1* | 7/2017 | Tolbert | B60S 1/685 |
| 2018/0206622 | A1* | 7/2018 | Wilson | A46B 5/0012 |

* cited by examiner

WHEEL BRUSH FOR A WHEELCHAIR

BACKGROUND OF THE INVENTION

1. Field of the Invention

The present invention relates to a brush that attaches to a vertical rearwardly located post of an armrest of a wheelchair wherein the brush acts upon and cleans the main wheel of the wheelchair.

2. Background of the Prior Art

Typical wheelchairs have a pair of rear or main wheels and a pair of front or caster wheels. In a manual wheelchair, the main wheels act as the drive wheels that are driven by the user of the wheelchair wherein the user grasps a push ring that is concentric with the rear wheel and places force on the push ring in order to turn the main wheel in response. Each main wheel is similarly configured—of course the wheelchair can also be locomoted by another person pushing or pulling the wheelchair via rearwardly situated push handles. The caster wheels, which tend to be substantially smaller than the main wheels, are swivelly attached to the frame of the wheelchair and assist in turning of the wheelchair with the actual steering being accomplished via uneven force or opposing force being placed on the two push rings. This wheelchair architecture proves adequate and versatile for many wheelchair users.

One of the problems experienced by users of these types of wheelchairs is getting dirt on the outer periphery—the tread—of the main wheels, often from using the wheelchair outside but sometimes from indoor use as well. Such dirt poses certain problems including making for a bumpy ride, especially if the dirt gets caked onto the wheel, making the wheelchair slippery and difficult to maneuver which can be especially problematic in descent mode, and the problem of getting the floor on which the wheelchair rides dirty, which is especially problematic when using the wheelchair indoors.

Additionally, due to the proximity of the push ring to its main wheel, many users frequently come in contact with the main wheel during locomotion so that some of the dirt transfers to the user's hands and lower arm regions.

If a user resides in a facility such as an assisted living facility or nursing home, the user can ask staff to help clean the wheels when they get dirty. While effective, staff may not be readily available, especially if the user is traveling remote of the facility such as a trip to the mall. Some users can ask their home located significant other to correct the dirty wheel problem, which also suffers from the problem of significant other (or other caretaker) not being present when needed. Some users attempt to address the problem themselves by cleaning the wheel as needed. While often effective, this solution is time-consuming and often frustrating for the user and requires the user to be prepared with an appropriate implement for the job such as a cleaning rag which itself must be transported until appropriately discarded.

To address these problems, devices have been proposed which automatically clean the main wheels of a wheelchair whenever the wheelchair is in motion. Such devices, which come in a wide variety of architectures and work with varying degrees of efficiency, suffer from certain drawbacks. Many such devices are relatively complex in design and construction so that manufacture and installation of such devices is prohibitive. Some devices add a noticeable drag or rolling resistance to the wheelchair requiring the user or his or her attendant if the wheelchair is being pushed, to work harder to overcome this resistance. Some devices require alterations be made to the wheelchair to install the device which alterations many users are not willing to make, especially if the wheelchair does not belong to the user.

What is needed is a wheelchair brush that cleans the main wheels of a wheelchair which overcomes the above-stated shortcomings found in the art. Specifically, such as device must be of relatively simple design and construction so as to be easy to install, use and maintain. Such a device must not significantly increase the rolling resistance of the wheel which the device services. Such a device must not require a permanent alteration be made to the wheelchair for proper usage of the device.

SUMMARY OF THE INVENTION

The wheel brush for a wheelchair of the present invention addresses the aforementioned needs in the art by providing a brush that is removably attached to a wheelchair and cleans a main wheel of the wheelchair whenever the wheelchair is in motion. The wheel brush for a wheelchair is of relatively simple design and construction, being produced using standard manufacturing techniques, so that the device is relatively inexpensive to produce so as to be economically attractive to potential consumers for this type of device. The wheel brush for a wheelchair adds negligible rolling resistance to the wheel that the device is servicing so that many users will not differentiate between the device's presence and absence from a workload requirement on the push ring point of view. The wheel brush for a wheelchair is removably attached to the wheelchair without the need for special tools or training and does not require any permanent alteration be made to the wheelchair.

The wheel brush for a wheelchair of the present invention is comprised of an elongated inverted U-shaped brush housing that has a base plate with a pair of coextensive side plates extending downwardly from either side of the base plate and also has a pair of inwardly directed end plates, each end plate terminating at a tip, and each end plate extending from a distal edge of a respective one side plate. The base plate, the side plates and the end plates form a longitudinal channel along the brush housing such that the channel has an open bottom between the tips. A brush head has a brush base and a series of bristles depending downwardly from the brush base. The brush head is slidably disposed within the channel so that the series of bristles extend outwardly from the opening. A clip is attached to the housing such that the clip is attached to the arm rest post and is positioned about the post so that the bristles engage a portion of an outer periphery of a respective one of the wheels of the wheelchair. The clip is generally C-shaped and may be made from a resilient material. The brush housing has a first cross section between an inner surface of each of the side plates and a second cross section between the tips and the brush head has a width that is greater in dimension relative to the second cross section and smaller in dimension relative to the first cross section, thereby preventing the brush from falling out of the channel through the open bottom

BRIEF DESCRIPTION OF THE DRAWINGS

Similar reference numerals refer to similar parts throughout the several views of the drawings.

DESCRIPTION OF THE PREFERRED EMBODIMENT

Figure 1:
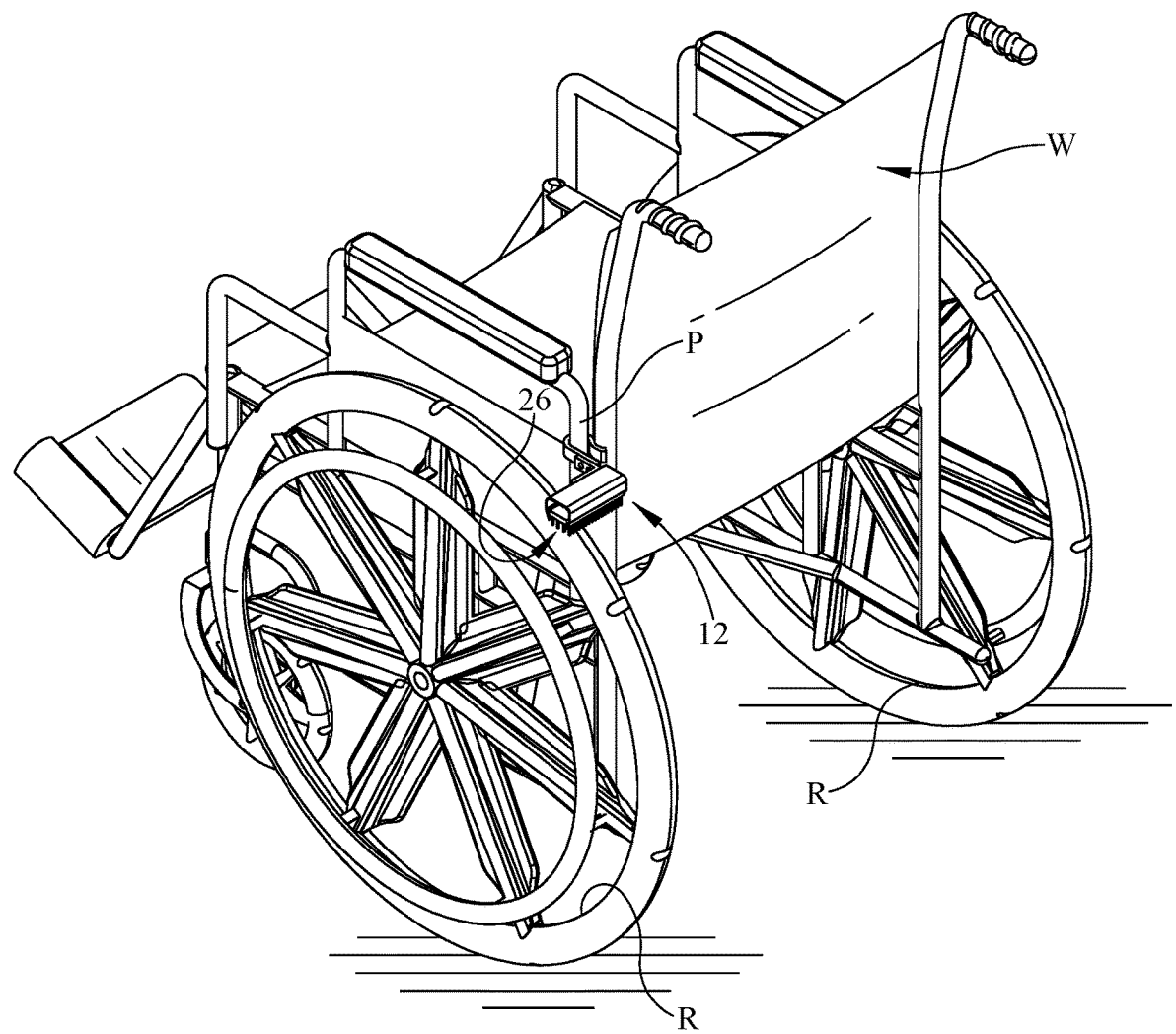
FIG. 1 is a perspective view of the wheel brush for a wheelchair of the present invention installed on a wheelchair.
Figure 2:
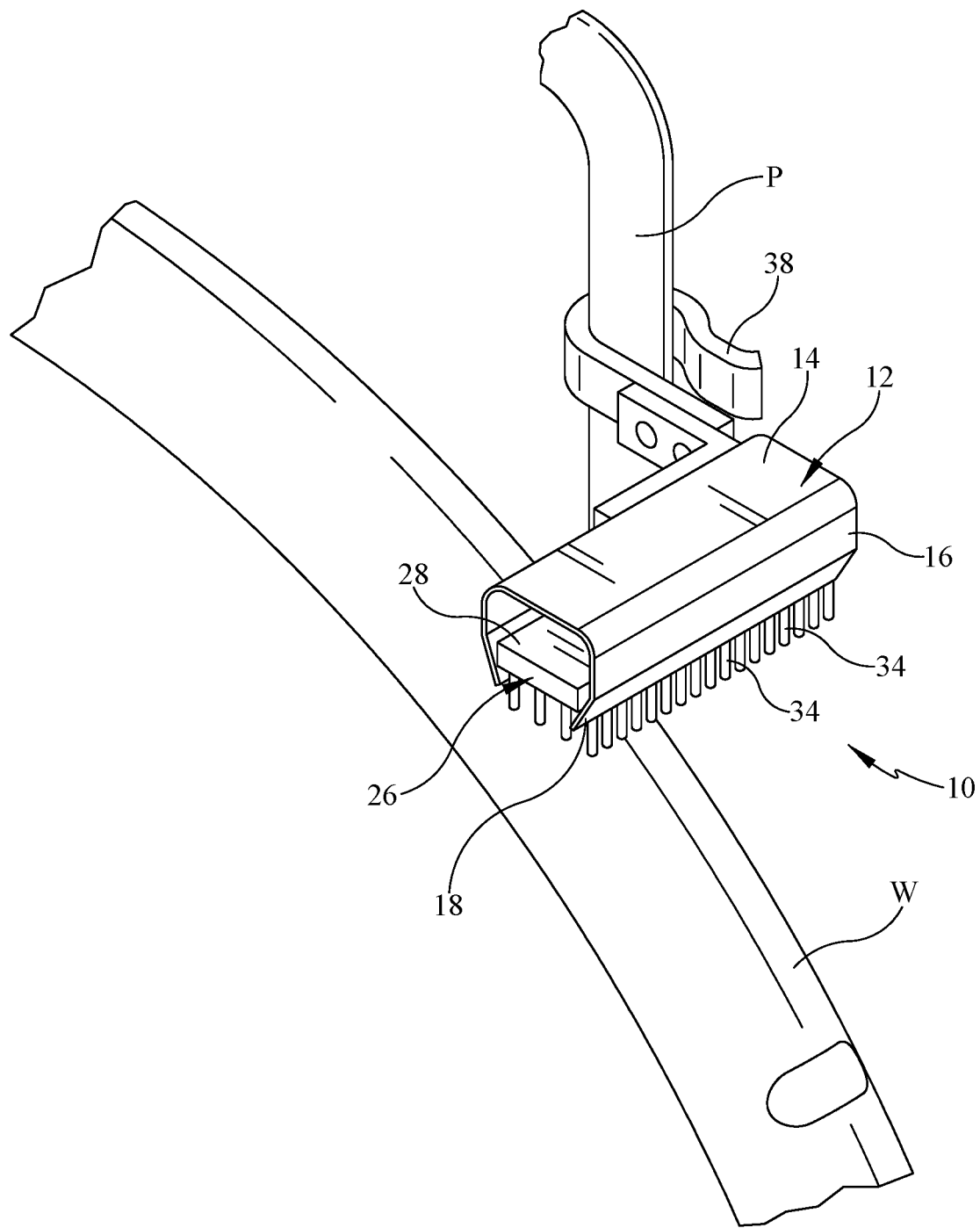
FIG. 2 is a close-up perspective view of the wheel brush for a wheelchair attached to the wheelchair.
Figure 3:
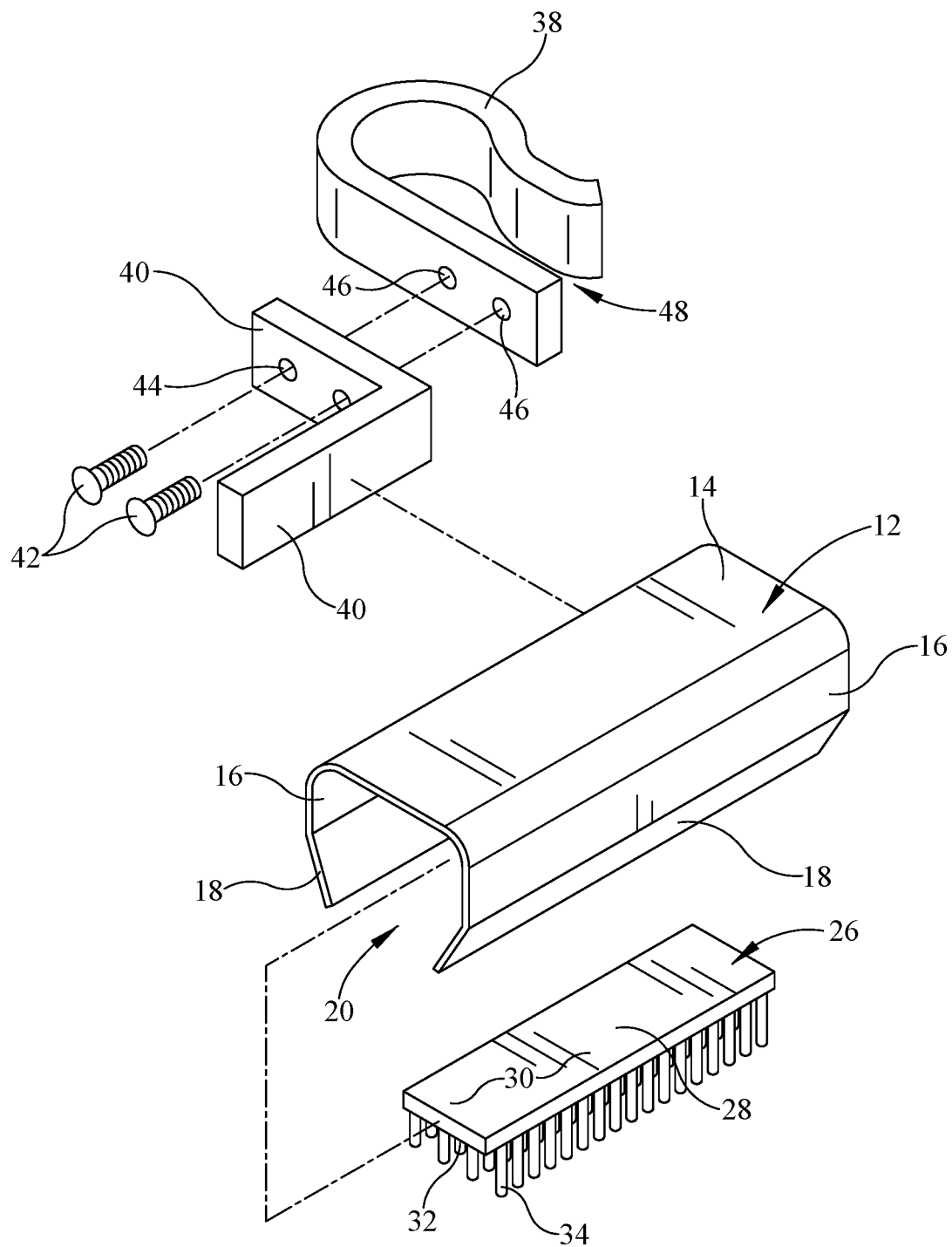
FIG. 3 is an exploded view of the wheel brush for a wheelchair.
Figure 4:
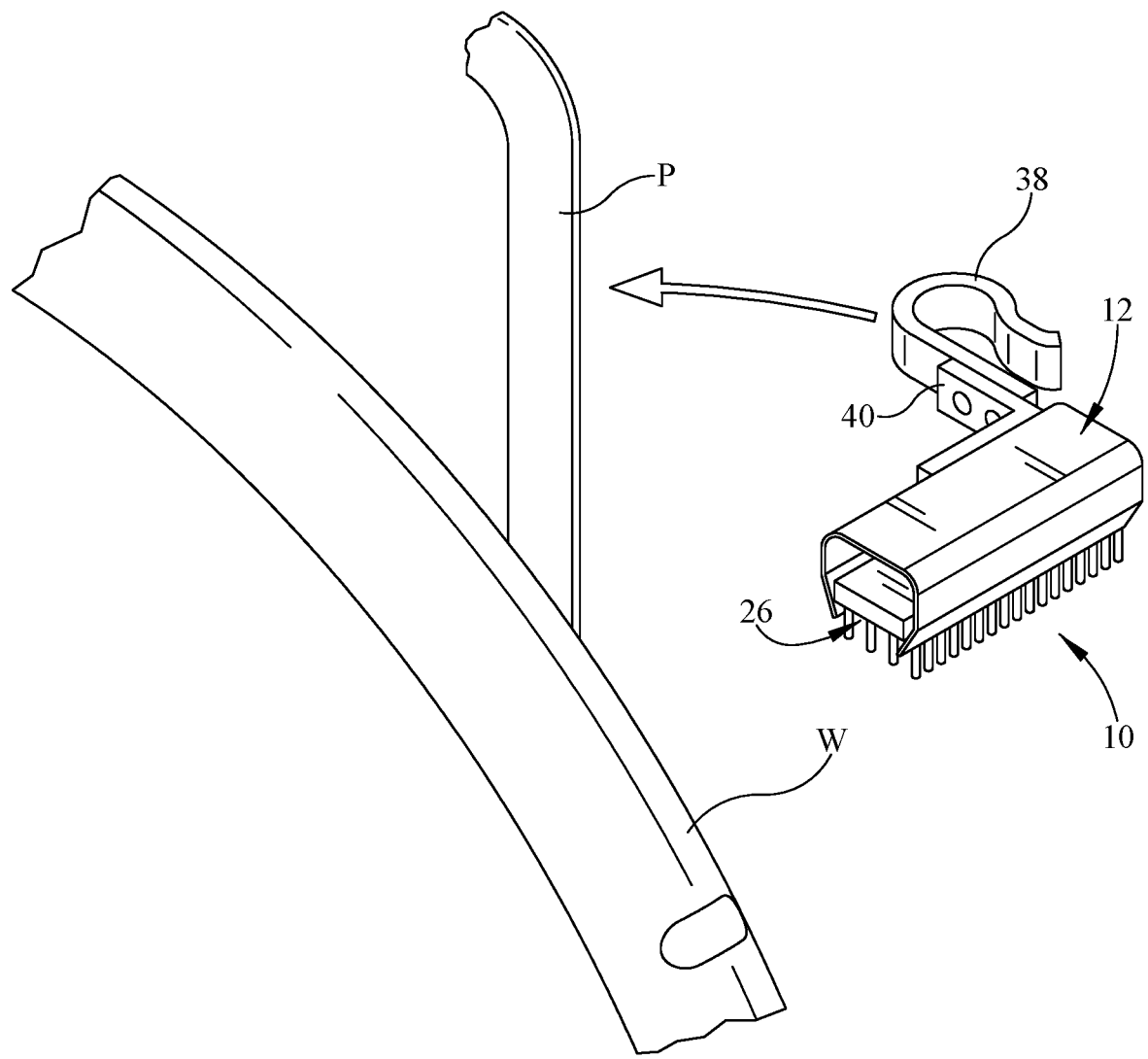
FIG. 4 is a close-up perspective view of the wheel brush for a wheelchair being installed onto the wheelchair.

Referring now to the drawings, it is seen that the wheel brush for a wheelchair of the present invention, generally denoted by reference numeral 10, is comprised of a brush housing 12. As seen, the brush housing 12 is an inverted generally U-shaped member that has a base plate 14 with a pair of coextensive side plates 16 and a pair of inwardly directed end plates 18 such that a longitudinal channel 20 is formed within the brush housing 12. The brush housing 12 is formed as a unitary (possibly even monolithic) member and is made from an appropriate material such as plastic or metal. A first inside cross section 22 is defined between the inner surfaces of the side plates 16 while a second cross section 24 is defined between the tips of the inwardly directed end plates 18.

Figure 5:
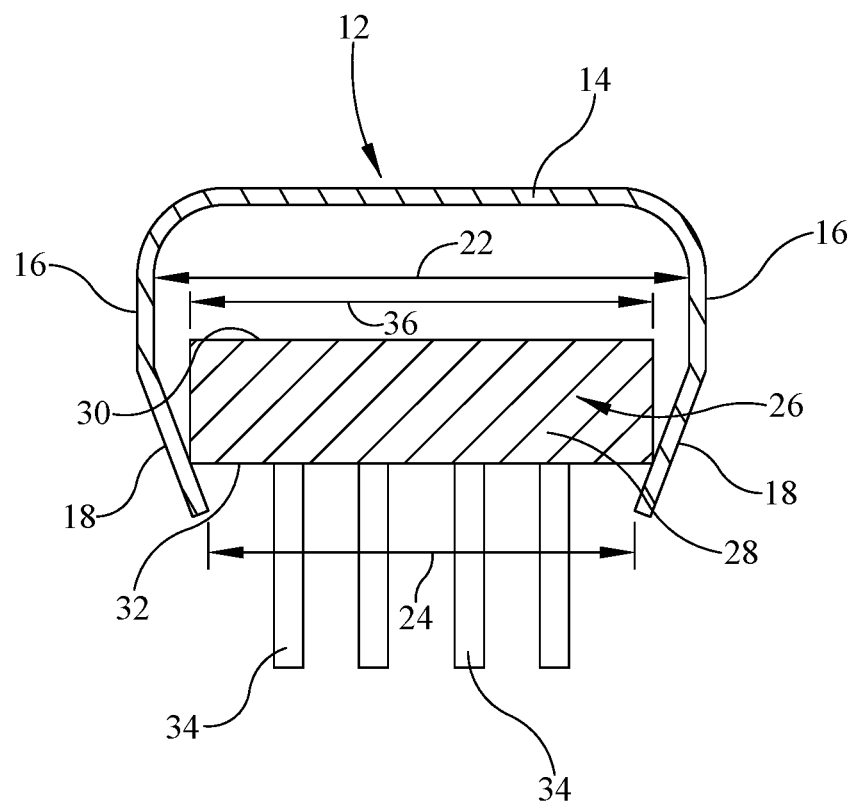
FIG. 5 is a side sectioned view of the wheel brush for a wheelchair.
Figure 6:
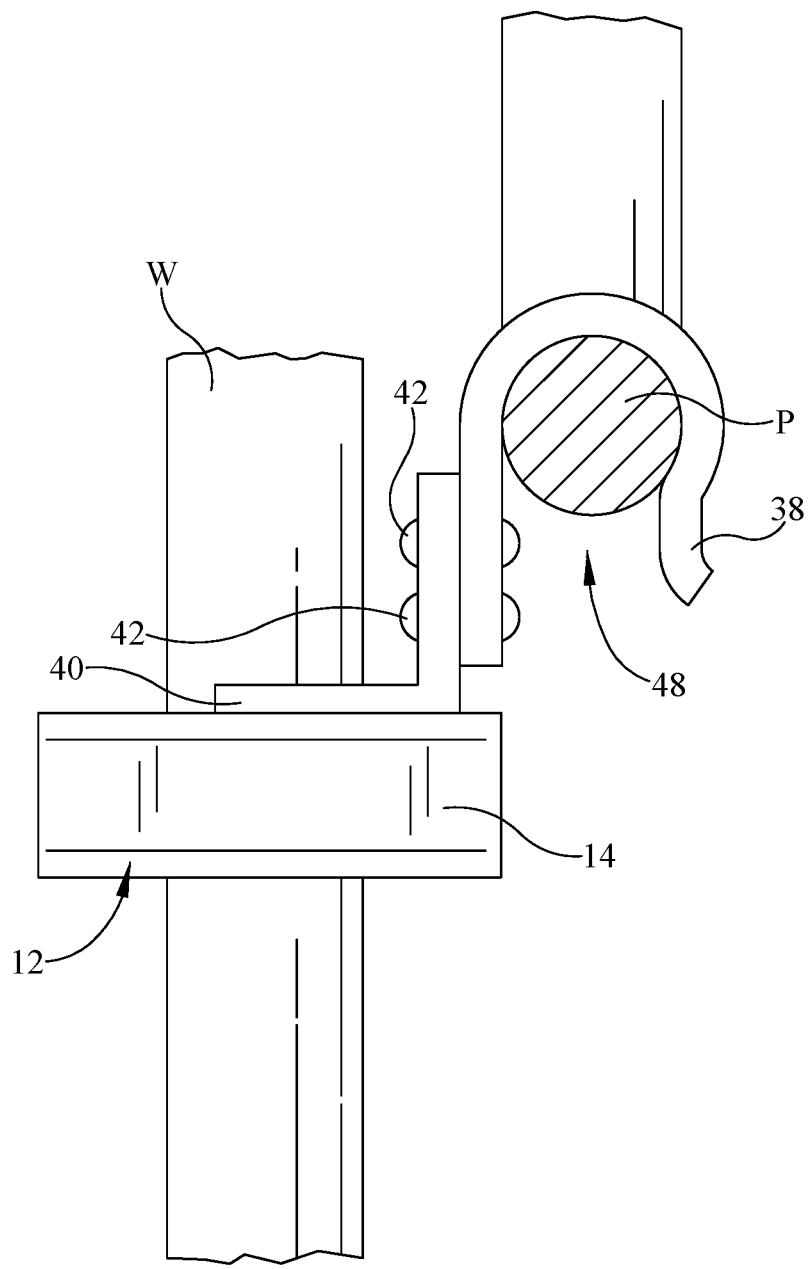
FIG. 6 is a close-up side view of the wheel brush for a wheelchair installed on the wheelchair.

A brush head 26 has a brush base 28 with an upper surface 30 and a lower surface 32 such that a series of bristles 34 extend downwardly from the lower surface 32 of the brush base 28. The brush base 28 has a length that is similar, more or less, to the length of the brush housing and has a width 36 that is less than the first cross section 22 and greater than the second cross section 24. The brush head 26 is received within the brush housing 12 by longitudinally sliding the brush head 26 into the channel 20 formed within the brush housing 12. As the width 36 of the brush base 28 is less than the first cross section 22—the upper portion of the channel 20—the brush head 26 is free to slide therein. Once the brush head 26 is in the desired position within the channel 20, the brush base 28 sits on the inside surfaces of the inwardly directed end plates 18, being prevented from dropping out of the open bottom of the channel 20 due to the fact that the width 36 of the brush base 28 is greater than the second cross section 24 of the brush housing 12 as best seen in FIG. 5 which second cross section 24 is taken at the open bottom of the channel 20. As seen, the bristles 34 extend out from the open top of the channel 20.

An open, clip 38, which may but need not necessarily be C-shaped, is attached to the brush housing 12 at a desired location such as to one of the side plates 16 in any appropriate fashion such as via the illustrated connector 40 that is attached to the brush housing 12 in any appropriate fashion such as via adhesion, welding. Etc., (may also be formed integrally with the brush housing 12). The connector 40 is also attached to the clip 38 in any appropriate fashion such as via the illustrated screws 42 that pass through openings 44 in the connector 40 and corresponding openings 46 in the clip 38—of course the connector 40 can be attached to the clip 38 in a manner similar to attachment of the connector 40 to the brush housing 12 or may be formed integrally with the clip 38. The clip 38 and the connector 40 are each made from an appropriate material such as metal or plastic such that the clip 38 is sufficiently resilient to clip onto a target surface as form fully described below.

In order to use the wheel brush for a wheelchair 10 of the present invention, a desired brush head 26 is selected and installed within the brush housing 12 as previously described. The clip 38 and its attached brush housing 12 with brush head 26 installed therein is attached to a wheelchair W by clipping the clip 38 onto the rearward located vertical arm rest post P of the wheelchair W or similar vertical stanchion, depending on the particular design of the wheelchair W. The clip 38 is sufficiently resilient to allow the gap 48 of the clip 38 to allow the arm rest post P to pass therepast and thereafter to resiliently close so that the gap 48 closes back to its original, generally relaxed dimension so that the clip 38 cannot thereafter be easily removed from the arm rest post P—of course other types of attachment clips can be used to attach the device to the post P. The wheel brush for a wheelchair 10 is slid down the arm rest post P until the bristles 34 of the brush head 26 engage the outer circumference of a wheel R. As the wheelchair W is rolled about a ground surface, the rotating wheel R is brushed by the bristles 34 of the brush head 26, thereby removing dirt and debris from the wheel R as the wheel R rotates. A second wheel brush for a wheelchair 10 is installed in similar fashion on the opposite side of the wheelchair W in order to clean the other wheel R.

Whenever the brush head needs changing, either to be cleaned and replaced or simply replaced due to being worn out or to use a different bristle configuration, the brush head 26 is slid out of the channel 20 of the brush housing 12 and a new brush head 26 (or the old brush head 26 after being cleaned) is slid back into the channel 20 of the brush housing.

While the invention has been particularly shown and described with reference to an embodiment thereof, it will be appreciated by those skilled in the art that various changes in form and detail may be made without departing from the spirit and scope of the invention.

I claim:

1. A brush for a wheelchair, the wheelchair having a pair of back wheels and an arm rest post for supporting an arm rest, the brush comprising:

an elongate inverted U-shaped brush housing having a base plate with a pair of coextensive side plates extending downwardly from either side of the base plate and a pair of inwardly directed end plates, each terminating at a tip, each end plate extending from a distal edge of a respective one side plate such that an opening is formed between the tips and such that the base plate, the coextensive side plates and the end plates form a longitudinal channel with an open bottom between the tips;

a brush head having a brush base and a series of bristles depending downwardly from the brush base such that the brush head is slidably disposed within the longitudinal channel so that the series of bristles extend outwardly from the opening;

a C-shaped clip operably attached to the brush housing such that the clip is adapted to attach to the arm rest post and be positioned about the post so that the bristles engage a portion of an outer periphery of a respective one of the back wheels; and a generally L-shaped connector having a first leg attached to a side of the clip and a second leg attached to one of the side plates of the brush housing and wherein when secured to the arm rest post of the wheelchair, the elongate brush housing is oriented transverse with respect to the associated back wheel.

2. The brush as in claim 1 wherein the brush housing has a first cross section between an inner surface of each of the side plates and a second cross section between the tips and the brush head has a width that is greater in dimension relative to the second cross section and smaller in dimension relative to the first cross section.

3. The brush as in claim 1 in combination with the wheelchair.

4. The brush as in claim 3 wherein the brush housing has a first cross section between an inner surface of each of the side plates and a second cross section between the tips and the brush head has a width that is greater in dimension relative to the second cross section and smaller in dimension relative to the first cross section.

\* \* \* \* \*